(12) United States Patent
Amou et al.

(10) Patent No.: US 6,895,012 B2
(45) Date of Patent: May 17, 2005

(54) METHOD AND APPARATUS FOR PACKET SCHEDULING IN NETWORK

(75) Inventors: Kensaku Amou, Kawasaki (JP); Yan Xu, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 804 days.

(21) Appl. No.: 09/816,034

(22) Filed: Mar. 22, 2001

(65) Prior Publication Data

US 2001/0026535 A1 Oct. 4, 2001

(30) Foreign Application Priority Data

Mar. 30, 2000 (JP) ........................................ 2000-094896

(51) Int. Cl.[7] .............................................. H04L 12/56
(52) U.S. Cl. ................................ 370/395.4; 370/395.41
(58) Field of Search ............................ 370/412, 395.21, 370/395.4, 395.41

(56) References Cited

U.S. PATENT DOCUMENTS

| | | | | |
|---|---|---|---|---|
| 6,091,709 A | * | 7/2000 | Harrison et al. | 370/235 |
| 6,104,700 A | * | 8/2000 | Haddock et al. | 370/235 |
| 6,269,079 B1 | * | 7/2001 | Marin et al. | 370/230 |
| 6,538,992 B1 | * | 3/2003 | Subbiah et al. | 370/230 |
| 6,570,876 B1 | * | 5/2003 | Aimoto | 370/389 |
| 6,678,248 B1 | * | 1/2004 | Haddock et al. | 370/235 |

FOREIGN PATENT DOCUMENTS

| | | |
|---|---|---|
| JP | 11-41241 | 2/1999 |
| JP | 11-112527 | 4/1999 |

OTHER PUBLICATIONS

"A Generalized Processor Sharing Approach to Flow Control in Integrated Service Networks: The Single–Node Case", Jun. 1993, A.K. Parekh et al, IEEE/ACM Trans. on Networking, vol. 1, pp. 344–357.

"A Self–Clocked Fair Queueing Scheme for Broadband Applications", 1994, S. Golestani, pp. 636–646.

"Virtual Clock: A New Traffic Control Algorithm for Packet Switching Networks", 1990, L. Zhang, pp. 19–29.

* cited by examiner

Primary Examiner—Kenneth Vanderpuye
(74) Attorney, Agent, or Firm—Katten Muchin Zavis Rosenman

(57) ABSTRACT

A packet scheduling apparatus made it possible to always hold priority orders determined in advance for preferentially controlled priority queues while guaranteeing reserved bandwidths for bandwidth guaranteed queues. This packet scheduling apparatus is configured by a service time computing unit for computing service times for bandwidth guaranteed queues and priority queues having high priority orders based on input plurality of predetermined parameters, a service time comparing unit for comparing magnitudes of the computed service times with each other and selecting the packet to be output first, and a parameter generating unit for generating the parameters computed so as to achieve both a bandwidth guarantee and preferential control.

16 Claims, 14 Drawing Sheets

METHOD AND APPARATUS FOR PACKET SCHEDULING IN NETWORK

BACKGROUND OF THE INVENTION

1. Field of the Invention

The present invention relates to a method and an apparatus for packet scheduling for determining a sequence of reading a plurality of packets stored in a network apparatus in a network.

In recent years, the spread of multimedia and real-time applications etc. utilizing networks has led to a demand for guaranteeing the quality of service (QoS) provided by those networks. A network apparatus such as router, switch, and the like in this network requires a means for classifying packets into a plurality of queues in accordance with the type of the traffic and controlling the transfer of the packets while guaranteeing the quality of service (QoS) required for each queue. This means is a packet scheduling apparatus.

2. Description of the Related Art

Some factors for determining packet scheduling, that is, a sequence of reading packets guaranteeing the quality of service, can be considered. Particularly effective determinative factors are known to be bandwidth guarantee and preferential control.

Here, "bandwidth guarantee" means the guarantee of a bandwidth to be permitted for traffic, for example 100 Mbps, based on a reservation from a user.

On the other hand, "preferential control" means that, when the bandwidth is not reserved, not performing so-called best effort transfer, but giving a priority order to a plurality of traffic, based on a designation by a user, from traffic of a high priority to traffic of a low priority and, when the packets to be transferred are generated, reading out any packets to be transferred from the higher priority order of traffic to which those packets belong.

Accordingly, a packet scheduling apparatus has to read out packets while guaranteeing the reserved bandwidth and giving preference to traffic of a high priority order over traffic of a low priority order.

Conventionally, as a method of packet scheduling, "packet fair queuing" has been used. This packet fair queuing sets a weight based on the bandwidth reserved for every queue. If there is remaining bandwidth unused in the packet transfer, the remaining bandwidth is effectively utilized by being fairly reallocated according to the weight of every queue. Below, a detailed explanation will be given based on this packet fair queuing.

A well known method for realizing packet fair queuing is based on the method referred to as "Generalized Processor Sharing discipline" (GPS discipline) disclosed in a Reference 1 (A. K. Parekh and R. G. Gallager, "A Generalized Processor Sharing Approach to Flow Control in Integrated Service Networks: The Single-Node Case", IEEE/ACM Trans. on Networking, vol. 1, pp. 344–357, June 1993).

This GPS discipline is known as an ideal fluid model for packet fair queuing. This fluid model assumes that the coverage of service can be divided infinitely and that accordingly all flows (flows at the application level, for example, file transfer) can be serviced in parallel. However, a packet cannot be divided, therefore a plurality of packets cannot be simultaneously serviced. For this reason, in actual packet scheduling, a method approximating the GPS discipline is used. Note that, in the present invention, the term "packet fair queuing" is used as a generic term for methods of packet scheduling approximating the GPS discipline.

As one method of packet fair queuing, the method of packet scheduling referred to as weighted fair queuing (WFQ) is well known. This is used by computing a "service finish time" prescribed in the GPS discipline. This WFQ is disclosed in detail in Reference 1, but will be simply explained here.

The packets forming the flows are stored in queues corresponding to the flows. When representing each of these queues as a queue i (i=1, 2, 3, ... ), a weight $\phi i$ proportional to the bandwidth reserved for the queue i is set for the queue i. Further, the sum of the weights of queues in a backlog state is defined as $\phi b$. Here, when packets to be transmitted are stored in a queue, that queue is referred to as being in a "backlog state" or is referred to as an "active" one.

When using these $\phi i$, and $\phi b$, a variable Fi of each queue is computed as in the following equation (2) by r_i (outgoing rate after reallocation of packets of Qi) of the following equation (1). Fi (finish_i) is the service finish time.

$$r\_i = \phi i \times R / \phi b \tag{1}$$

$$Fi = \max(t\_i, F'i) + Li/ri \tag{2}$$

Note that, in equations (1) and (2), R represents the rate of an outgoing link, t_i an arrival time of a header packet of the queue i, Li a packet length of the header packet of the queue i, F'i the service finish time of the packet immediately before the packet to be output from now on, and max(t_i, F'i) a larger of t_i and F'i.

In WFQ, the header packet stored in the queue i having the minimum Fi among the Fi's computed by equation (2) is selected as a packet to be output next.

As mentioned above, in the method of packet scheduling by the conventional packet fair queuing wherein the packets to be output next are selected from among a plurality of queues i as mentioned above, the weights $\phi i$ of the packet fair queuing are set as follows.

First, a weight $\phi i$ is set for each traffic requesting a bandwidth guarantee based on the ratio of the bandwidths reserved for each traffic.

On the other hand, for traffic requesting preferential control, the weight $\phi i$ of the low priority traffic is set smaller than the weight $\phi i$ of the high priority traffic. By setting the weights in this way, the reserved bandwidth can be guaranteed for traffic requesting a bandwidth guarantee. On the other hand, high priority traffic is allocated bandwidth ($\phi i$) larger than that for the low priority traffic and preferentially output.

Note that, as another conventional packet fair queuing, the method of packet scheduling referred to as "self clocked fair queuing" (SCFQ) using a virtual clock to modify the WFQ to suppress the amount of computation has been proposed in Reference 2, S. Golestani, "A Self-Clocked Fair Queuing Scheme for Broadband Applications", In Proc. of INFOCOM 94, pp. 636–646, 1994. A similar method referred to as a "virtual clock" is proposed in Reference 3, L. Zhang, "Virtual Clock: A New Traffic Control Algorithm for Packet Switching Networking", In Proc. of SIGCOMM'90, pp. 19–29, 1990. The algorithm using this virtual clock can be applied in the present invention as well. This will be mentioned later as a second embodiment.

Summarizing the problems to be solved in the invention, in the method of packet scheduling by the conventional packet fair queuing, the packets of traffic are output according to only the bandwidth ($\phi i$) set in advance for the traffic. Accordingly, packets of low priority traffic are output according to the reserved bandwidth irrespective of if packets of high priority traffic are stored in queues. For this reason, there are cases where packets of high priority traffic which originally must be output first are output after the packets of low priority traffic. As a result, the order of output of the high priority packets and the low priority packets are reversed. When viewing this in the unit of packets, there was a problem in that the high priority traffic could not preferentially receive service relative to the low priority traffic.

SUMMARY OF THE INVENTION

An object of the present invention is to provide a method and apparatus for packet scheduling guaranteeing the bandwidth reserved under a bandwidth guarantee and guaranteeing preference to packets of high priority traffic over packets of low priority traffic under preferential control.

Namely, an object of the present invention is to realize both bandwidth guarantee and preferential control at all times.

To attain the above object, there is provided a packet scheduling apparatus configured by a service time computing unit (2) for computing service times for bandwidth guaranteed queues and priority queues having high priority orders based on an input plurality of predetermined parameters, a service time comparing unit (3) for comparing magnitudes of the computed service times with each other and selecting the packets to be output first, and a parameter generating unit (1) for generating the parameters computed so as to achieve both bandwidth guarantee and preferential control.

By such a configuration, the reserved bandwidth of each queue is guaranteed for each bandwidth guaranteed queue, while a priority order determined in advance is constantly maintained for the preferentially controlled priority queues.

BRIEF DESCRIPTION OF THE DRAWINGS

The above objects and features of the present invention will be more apparent from the following description of the preferred embodiments given with reference to the accompanying drawings, wherein.

DESCRIPTION OF THE PREFERRED EMBODIMENTS

Preferred embodiments of the present invention will be described in detail below while referring to the attached figures.

Figure 1:
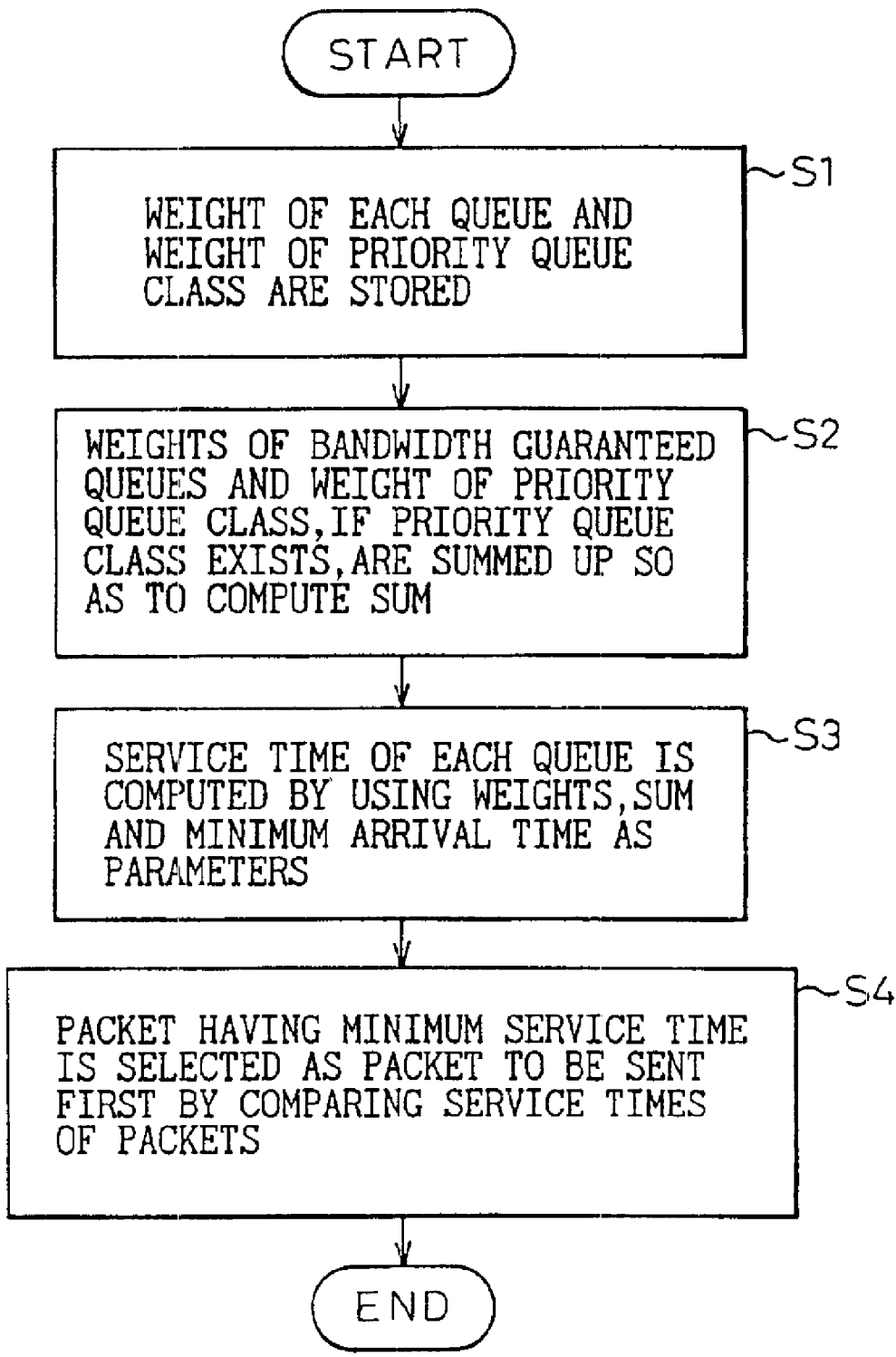
FIG. 1 is a flowchart of the basic steps of a method of packet scheduling according to the present invention.

FIG. 1 is a flowchart of the basic steps of a method of packet scheduling according to the present invention.

Figure 2:
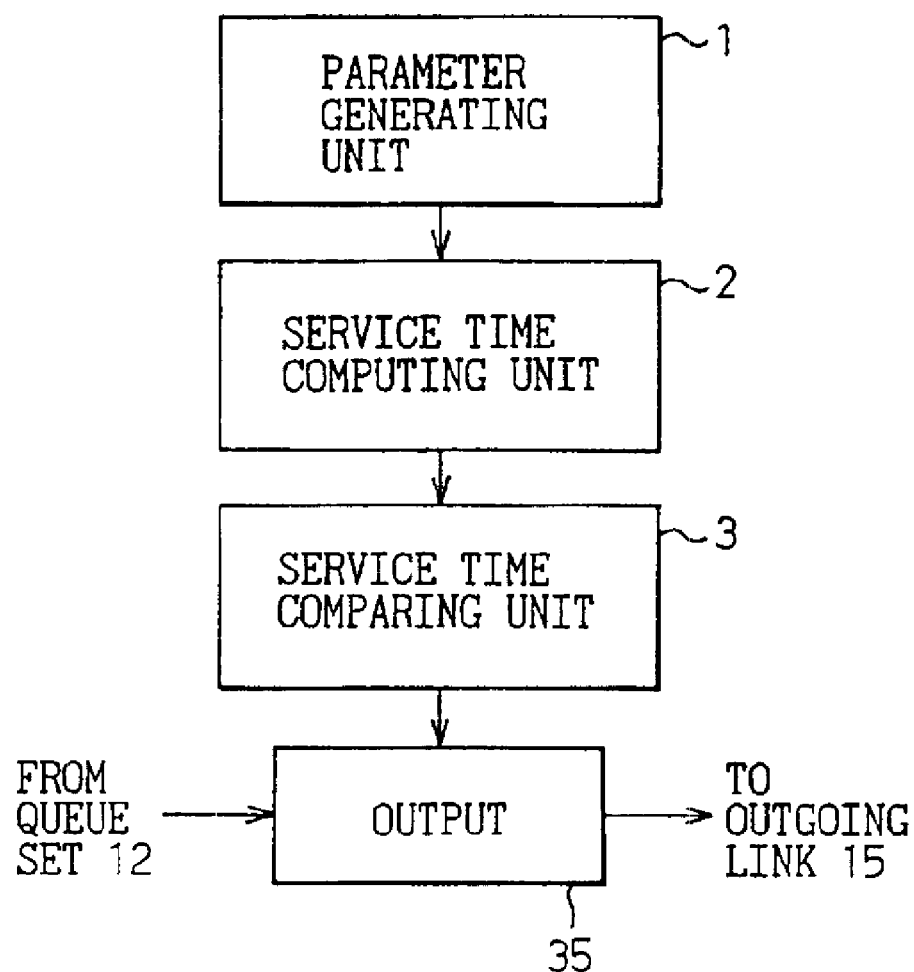
FIG. 2 is a view of the fundamental configuration of a packet scheduling apparatus according to the present invention.

FIG. 2 is a view of the fundamental configuration of a packet scheduling apparatus based on the present invention.

The method according to the present invention is a method of packet scheduling for selecting a packet to be output first from among packets stored in a plurality of bandwidth guaranteed queues (13) having reserved bandwidths guaranteed therefor and queues of a priority queue class (14) having a plurality of priority queues to be preferentially controlled with priority orders set in advance therefor and comprises the following steps S1 to S4 shown in FIG. 1:

Step S1: The weights given to the bandwidth guaranteed queues and the weight given to the overall priority queue class ($\phi i$, $\phi p$) are stored.

Step S2: The stored weights are referred to so as to total the weights of the bandwidth guaranteed queues when there are queues in the backlog state and the weight of the priority queue class when there are priority queues in the backlog state and compute the sum ($\phi b$).

Step S3: The service times are computed for the queues in the backlog state by using at least the weights, sum, and minimum arrival time (t_min) of the packet having the high priority order which arrives at the priority queue class first as parameters.

Step S4: The single packet having the minimum service time is selected as the packet to be output first by a comparison of the magnitudes of the service times.

Note that it is also possible to compute the service time by using a virtual clock v(T) in place of a real clock.

The apparatus according to the present invention is an apparatus capable of executing the method of packet scheduling and has a fundamental configuration shown in FIG. 2.

Referring to FIG. 2, the packet scheduling apparatus 11 of the present invention comprises the blocks 1 to 3 shown in the figure.

A service time computing unit 2 computes the service times based on an input plurality of predetermined parameters for the bandwidth guaranteed queues in the backlog state (13) and the priority queue (14) in the backlog state and having the highest priority order.

A service time comparing unit 3 compares the magnitudes of the computed service times with each other and selects the packet having the minimum service time as the packet to be output first.

The parameter generating unit 1 generates the parameters computed so as to achieve both bandwidth guarantee and preferential control.

Figure 3:
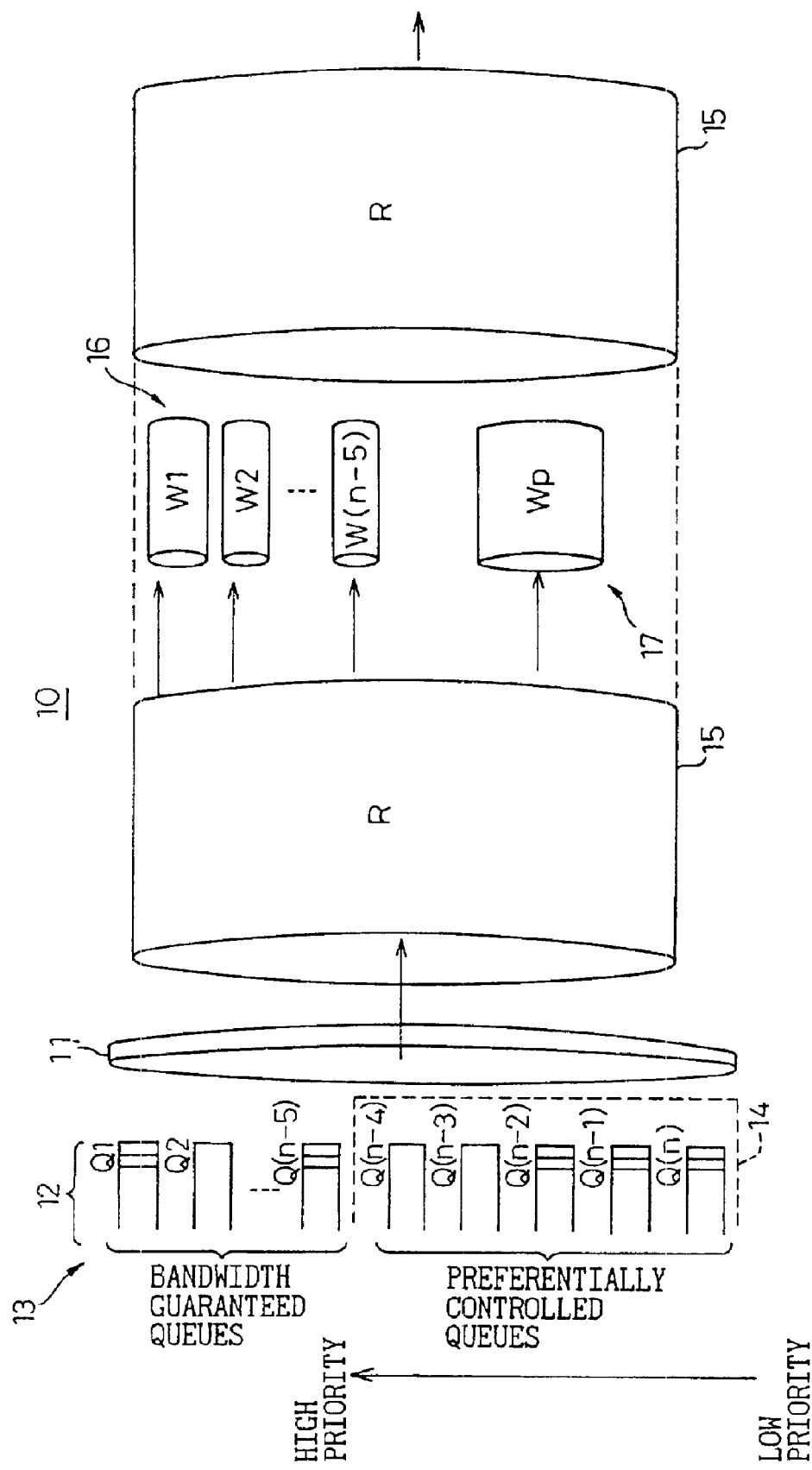
FIG. 3 is a view of an example of a packet transfer system with the packet scheduling apparatus according to the present invention applied thereto.

FIG. 3 is a view of an example of the packet transfer system with the packet scheduling apparatus according to the present invention applied thereto. Note that, throughout all of the figures, the same reference numerals or symbols are attached to similar components.

In the figure, reference numeral 10 shows the packet transfer system. This is formed in a network apparatus such as router, switch, and the like.

The main component of the present invention in this packet transfer system 10 is the packet scheduling apparatus 11, that is, a so-called "scheduler".

The packet scheduling apparatus 11 is provided with a queue set 12 comprising a plurality of queues on its input side and has an output side connected to the outgoing link 15.

The queue set 12 includes bandwidth guaranteed queues 13 and the priority queue class 14 as illustrated. The queues belonging to the bandwidth guaranteed queues 13 are indicated as Q1, Q2, . . . , Q(n-5) as an example, while the queues belonging to the priority queue class 14 are indicated as priority queues (preferentially controlled queues) Q(n-4), Q(n-2), . . . , Qn as an example. Note that, the method of the allocation of queues is not limited to this example and may be any method.

One of the group of packets in the queue set 12 is selected based on packet fair queuing in the packet transfer apparatus 11. The selected packet is sent to the outgoing link 15 and transmitted to the opposing equipment (not illustrated).

The speed of the outgoing link 15, that is, the outgoing link rate, is indicated as R in the figure. The outgoing link rate R is actually a line speed, a line capacity, an outgoing bandwidth, etc.

The ratios of the bandwidths sharing this outgoing link rate R, that is, the weights (w), are assigned as illustrated. This is also one of the characteristic features of the present invention. Namely, R's are assigned to w1 to w(n-5) and wp. Here, when defining wi (i=1, 2, . . . , (n-5)) as reserved bandwidths of queues (Q1, Q2, . . . , Q(n-5)) of the bandwidth guaranteed queues 13, the reserved bandwidth wp of the priority queue class 14 (Q(n-4) to Qn) is set as:

$$wp = R - w\_\text{all} \quad (3)$$

w_all is the sum of the reserved bandwidths of the bandwidth guaranteed queues 13.

When the bandwidths are assigned in this way, the weights $\phi i$ (i=1, 2, . . . , (n-5)) of queues of the bandwidth guaranteed queues 13 and the weight $\phi p$ of the overall priority queue class 14 can be represented as:

$$\phi i = w\_i / R \quad (4)$$

$$\phi p = (R - w\_\text{all}) / R \quad (5)$$

By setting the weight $\phi i$ of each of the bandwidth guaranteed queues 13 and the weight $\phi p$ of the overall priority queue class 14 as in equations (4) and (5), achievement of both bandwidth guarantee and preferential control as aimed at by the present invention becomes easy.

Figure 4:
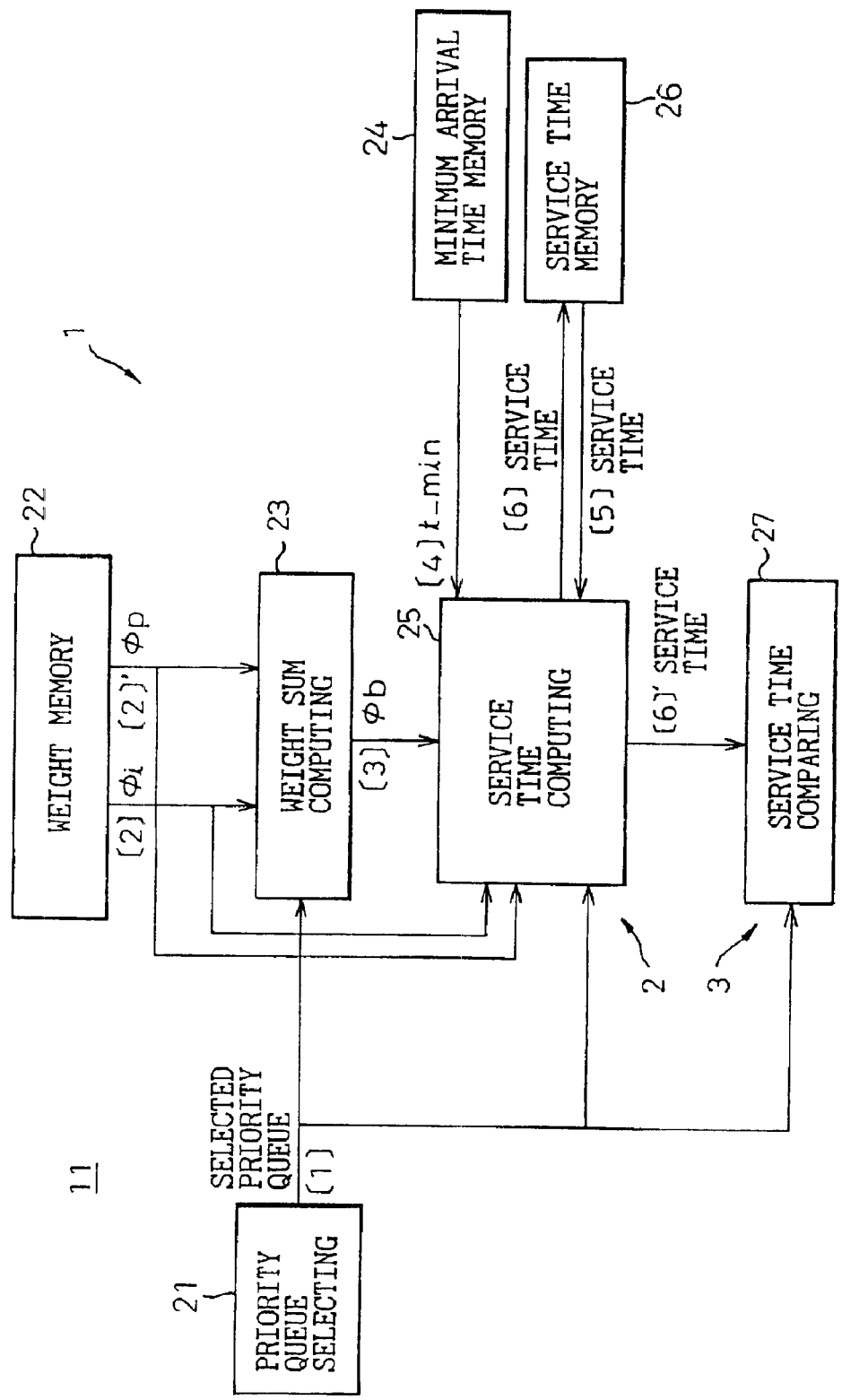
FIG. 4 is a view of the configuration according to a first embodiment of the present invention.

FIG. 4 is a view of the configuration according to a first embodiment of the present invention.

The service time computing unit 2 of FIG. 2 is indicated as a service time computing means 25 in FIG. 4, while the service time comparing unit 3 of FIG. 2 is indicated as a service time comparing means 27 in FIG. 4. The parameter generating unit 1 of FIG. 2 is indicated in FIG. 4 as a priority queue selecting means 21, a weight memory means 22, a weight sum computing means 23, a minimum arrival time memory means 24, a service time computing means 25, and a service time memory means 26.

In the present figure, the functions of the blocks 21 to 27 are as follows.

The priority queue selecting means 21 stores information of which queue in the class is the priority queue belonging to the priority queue class 14 (preferentially controlled queue), whether or not the packet is stored in each queue of the queue set 12 (queue state), and how is the priority order of each priority queue in the priority queue class 14 set and selects one priority queue for output of a packet based on the information and a predetermined algorithm.

The weight memory means 22 stores the weight $\phi i$ (equation (4)) of each queue of the bandwidth guaranteed queues 13 and the weight $\phi p$ (equation (5)) of the priority queue classes 14.

The weight sum computing means 23 computes the sum of the weights possessed by the queues (13, 14) storing the packets based on the backlog states of the queues in the queue set 12. When the priority queue 14 is selected by the priority queue selecting means 21 and any bandwidth guaranteed queue 13 is in the backlog state, the $\phi i$'s and $\phi p$ are summed by referring to the weight memory means 22. The sum is $\phi b$.

The minimum arrival time memory means 24 stores the arrival time of the packet arriving at the priority queue class 14 first among the packets stored in the priority queues in the priority queue class 14.

The service time computing means 25 computes the service time of a packet. The service time means the service finish time of the packet output immediately before the service, or, when now in service, a service finish estimated time thereof.

The service time memory means 26 stores the service times in relation to packets. This service time is the service time for a packet output from the same queue immediately before the service if that packet is a packet of a bandwidth guaranteed queue 13 or the service time for a packet output from the queue selected immediately before the service according to the priority order if that packet is a packet of the priority queue class 14.

The service time comparing means 27 compares the magnitudes of the service times for the queues (13, 14) computed in the service time computing means 25 with each other in cooperation with the minimum arrival time memory means 24 and the service time memory means 26, determines the service time which becomes the minimum among them, and selects the one queue corresponding to the related minimum service time. By this, one selected packet is transmitted from the packet scheduling apparatus 11 of FIG. 3 to the outgoing link 15.

Figure 5:
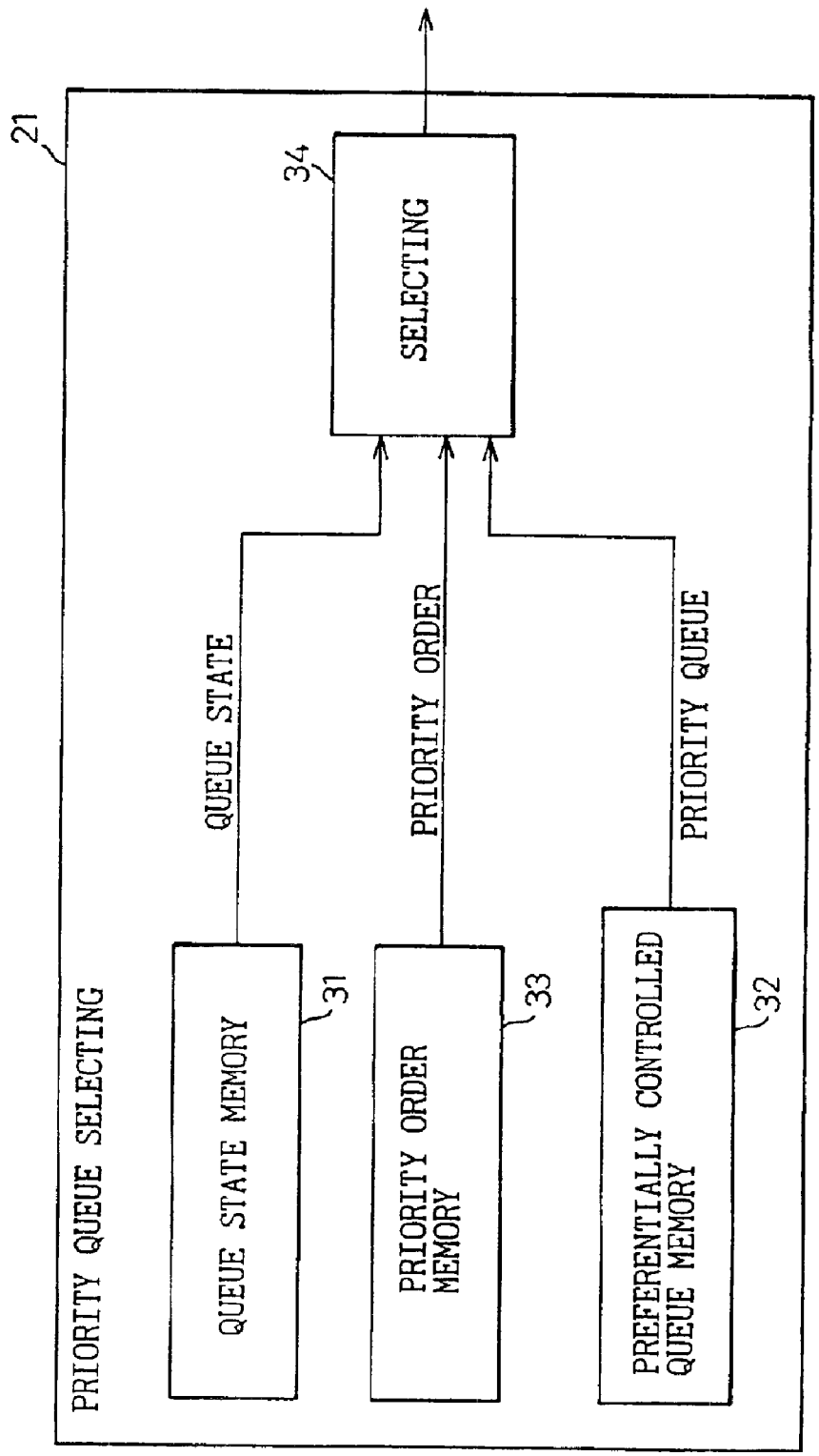
FIG. 5 is a view of an example of the concrete configuration of a priority queue selecting means 21 represented in FIG. 4.

FIG. 5 is a view of an example of the concrete configuration of the priority queue selecting means 21 represented in FIG. 4.

In the figure, the priority queue selecting means 21 comprises four means 31, 32, 33, and 34.

The queue state memory means 31 stores whether or not a packet is stored in the queue set 12.

The preferentially controlled queue memory means 32 stores the preferentially controlled queues (priority queues) belonging to the priority queue class 14 in the queue set 12.

The priority order memory means 33 stores the priority order of each priority queue belonging to the priority queue class 14.

The selecting means 34 outputs the packet information to be given to the weight sum computing means 23 next based on the "queue state" information, "priority order" information, and "priority queue" information from the means 31, 32, and 33.

Below, the operation of the packet scheduling apparatus 11 will be explained in detail by referring to FIG. 4 and FIG. 5.

1) The priority queue selecting means 21 selects the queue having the highest priority (high priority order) from among the priority queues storing the packets. The information of this selected queue is notified to the weight sum computing means 23, service time computing means 25, and service time comparing means 27 ([1] of FIG. 4).

As shown in FIG. 5, the priority queue selecting means 21 selects the priority queue as follows.

a) The queue state memory means 31, preferentially controlled queue memory means 32, and the priority order memory means 33 notify, respectively, whether or not one queue to be noted is in the backlog state, whether or not the queue is to be preferentially controlled and, if the queue is a priority queue, the priority order thereof, to the selecting means 34.

b) In the selecting means 34, the queue having the highest priority order is selected from among the queues in the backlog state and to be preferentially controlled.

2) The weight memory means 22 of FIG. 4 stores the weights $\phi i$ of queues of the bandwidth guaranteed queues 13 and the weight $\phi p$ of the priority queue class 14. These stored weights $\phi i$ and $\phi p$ are notified to the weight sum computing means 23 and the service time computing means 25 ([2] and [2]' of FIG. 4).

Note that, the weight $\phi i$ of each bandwidth guaranteed queue i and the weight $\phi p$ of the priority queue class are found according to equations (4) and (5) by:

$$\phi p = (R - w\_all)/R \text{ and}$$

$$\phi i = w\_i/R$$

As mentioned above, R is the outgoing link rate, w_i is the reserved bandwidth of each bandwidth guaranteed queue i, and w_all is the sum of the reserved bandwidths of the traffic to be bandwidth guaranteed.

3) The weight sum computing means 23 of FIG. 4 computes the sum $\phi b$ of all weights of the queues storing packets, that is, active queues, as in the following a) and b) and notifies the $\phi b$ to the service time computing means 25 ([3] of FIG. 2).

a) When at least one priority queue in the priority queue class 14 is in the backlog state, according to the following equation:

$$\phi b = (\text{sum } \Sigma \phi i \text{ of weights of bandwidth guaranteed queues } \phi i \text{ in backlog state}) + \phi p$$

b) When all of the priority queues of the priority queue class 14 are empty, according to the following equation:

$$\phi b = (\text{sum } \Sigma \phi i \text{ of weights of bandwidth guaranteed quesues } \phi i \text{ backlog state})$$

Note that concrete example of the computing routine of $\phi b$ described above will be explained later by referring to FIG. 6.

4) The minimum arrival time memory means 24 of FIG. 4 notifies the time of the packet having the minimum arrival time, that is, the minimum arrival time of the most previous arrival among the packets stored in the priority queues of the priority queue class 14, as t_min to the service time computing means 25 ([4] of FIG. 4).

5) The service time memory means 26 of FIG. 4 stores the service time computed at the service time computing means 25 in relation to the packet. The service time stored here is notified to the service time computing means 25 ([5] of FIG. 4).

6) The service time computing means 25 of FIG. 4 computes the service time Fi of the queue i, stores Fi after this computation in the memory means 26 again ([6] of FIG. 4) and, at the same time, notifies the same to the service time comparing means 27 ([6]' of FIG. 4).

The method for computing the service time and the packet covered differs depending on the packet fair queuing to be applied. For example, when the method of packet scheduling WFQ is used as the packet fair queuing, the service finish time in the GPS discipline of the header packet of each queue is computed as the service time described above. Further, when the method of packet scheduling referred to as the SFQ (Start-time Fair Queuing) is used as the packet fair queuing, the service start time in the GPS discipline is computed as the service time.

Note that, in both of the case where the WFQ is used and the case where the SFQ is used, according to the conventional method of consideration, as the parameters used when computing the service time Fi of the packet of the queue i, the following three parameters, that is t_i: arrival time of the packet, F'i: service time of the packet stored in the queue i immediately before the service, and $\phi\_i$: weight of the queue i will be used.

However, according to consideration of the method of the present invention, in addition to the above consideration of the above method, further, a modified t_i, F'_i, and $\phi\_i$ will be used particularly concerning the priority queue.

Namely, for the computation of the service time of a packet stored in the selected priority queue p, t_min, F'p, and $\phi\_p$ modified as follows are used as the parameters.

$$t\_i \rightarrow t\_min$$

$$F'\_i \rightarrow F'p$$

$$\phi\_i \rightarrow \phi\_p$$

where, t_min is the value stored in the minimum arrival time memory means 24,

F'p: a) If the service time Fi is the service time of the header packet of the queue, the service time of the packet, which is in service, of the priority queue class 14 or the service time of the packet serviced immediately before, b) if it is not the packet of the header of the queue, the service time of the packet stored in that queue immediately before the service, and $\phi\_p$: the weight set for the priority queue class 14.

Note that, it is assumed that the service time F'p of the header packet of the selected priority queue is computed again during a term where the priority queue is continuously selected.

Further, under the conventional packet fair queuing, for the computation of the service time, a sum of lengths of the packets stored in the queue is used. Under the conventional method, the sum of the packet lengths is used for the selected priority queues. According to the present invention, however, in place of the sum of the packet lengths of the selected priority queues, the sum of the packet lengths of the packets of the priority queue class 14 is used.

In this case, as the service time F'p of the unselected priority queues, a value larger than the maximum value of the values able to be taken as the service time is set. By this, in the following 7), when the magnitudes of the service times of all queues are compared, the related unselected priority queues will not be selected, so the related unselected priority queues can be easily excluded from the comparison.

7) The service time comparing means 27 of FIG. 4 compares the magnitudes of the service times of header packets of all active queues (13, 14) except the unselected priority queues. As the result of this comparison, it selects the header packet of the one queue having the minimum service time and sends this to the outgoing link 15.

In the above explanation, it was said that the computation routine of φb would be mentioned later. This is done here.

Figure 6:
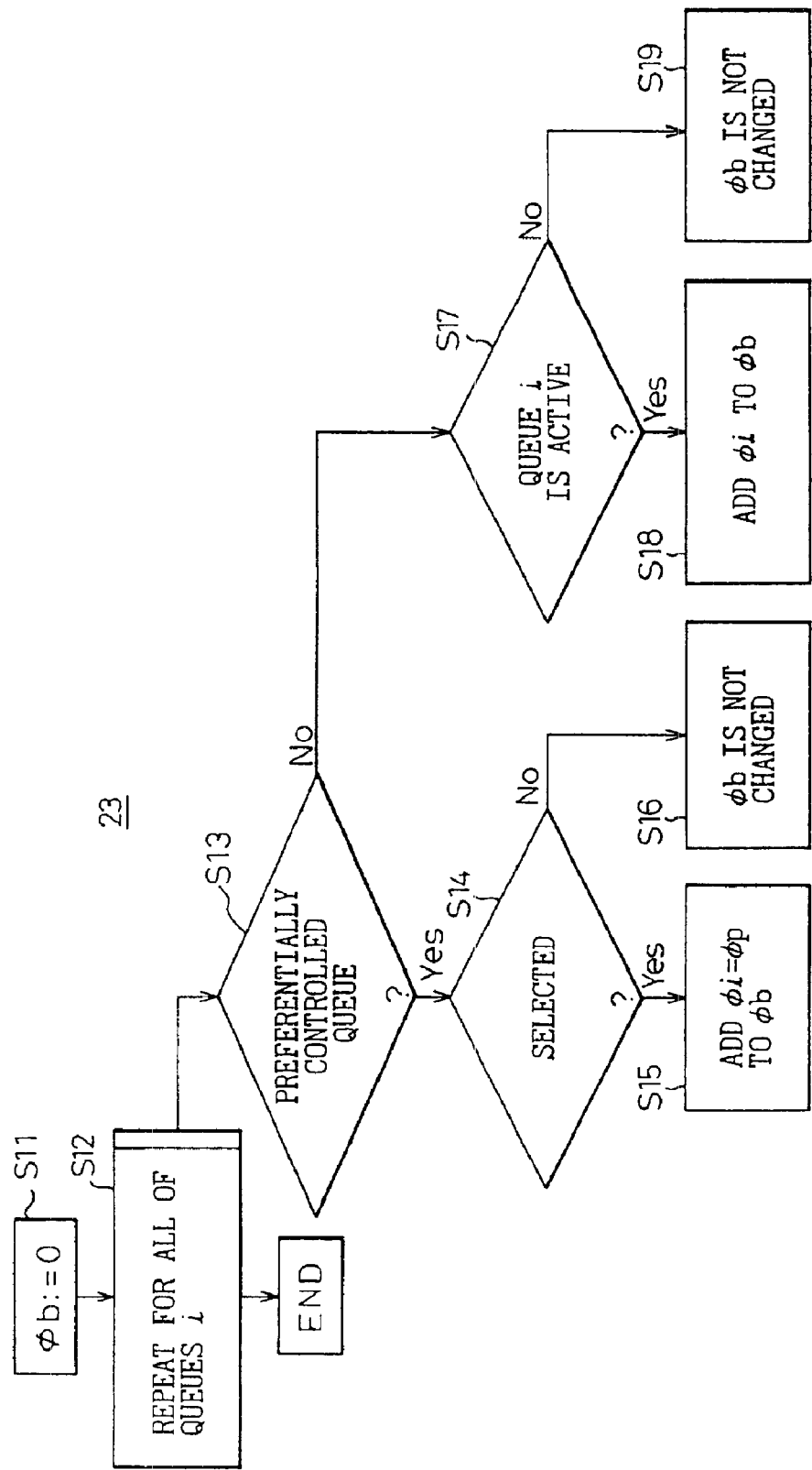
FIG. 6 is a flowchart of a concrete example of a computing routine of $\phi b$ by a weight sum computing means 23.

FIG. 6 is a flowchart of a concrete example of the computation routine of φb by the weight sum computing means 23.

Step S11: 0 is set as the initial value of φb of the sum of the weights of all queues.

Step S12: The steps of the present flowchart are repeatedly executed for each queue i.

Step S13: It is determined whether or not the queue i to be noted is a preferentially controlled queue (priority queue). For example, in the example shown at the left end of FIG. 3, if the queue corresponds to any one among Q(n-4) to Qn, the determination is Yes, while if it corresponds to any one among Q1 to Q(n-5), the determination is No.

Step S14: It is determined whether the priority queue i to be noted is selected (Yes) or not (No) in consideration with the priority order.

Step S15: The queue i to be noted is a selected priority queue, therefore φi=φp is added to the sum φb. φp is the weight of the priority queue class 14.

Step S16: The queue i to be noted is an unselected priority queue, therefore, as mentioned above, the queue i is excluded from the comparison by the service time comparing means 27 (FIG. 4), and nothing is added to the sum φb.

Step S17: When the determination at step S13 is No, that is, when the queue i to be noted is not a preferentially controlled queue (14) (when it is a bandwidth guaranteed queue 13), it is determined whether or not the queue i is active, that is, whether or not it stores packets.

Step S18: Since the queue i to be noted is active, the weight φi of the related queue i is added to the sum φb.

Step S19: Since the queue i to be noted is not active, it is not necessary to add the weight φi thereof to the sum φb, and φb is held as it is.

Note that, for the determination at each of steps S13, S14, and S17 mentioned above, the information from the priority queue selecting means 21 of FIG. 5 is used.

The packet scheduling apparatus 11 of the present invention explained using FIG. 3 to FIG. 6 will be explained by illustration for further easy understanding.

Figure 7:
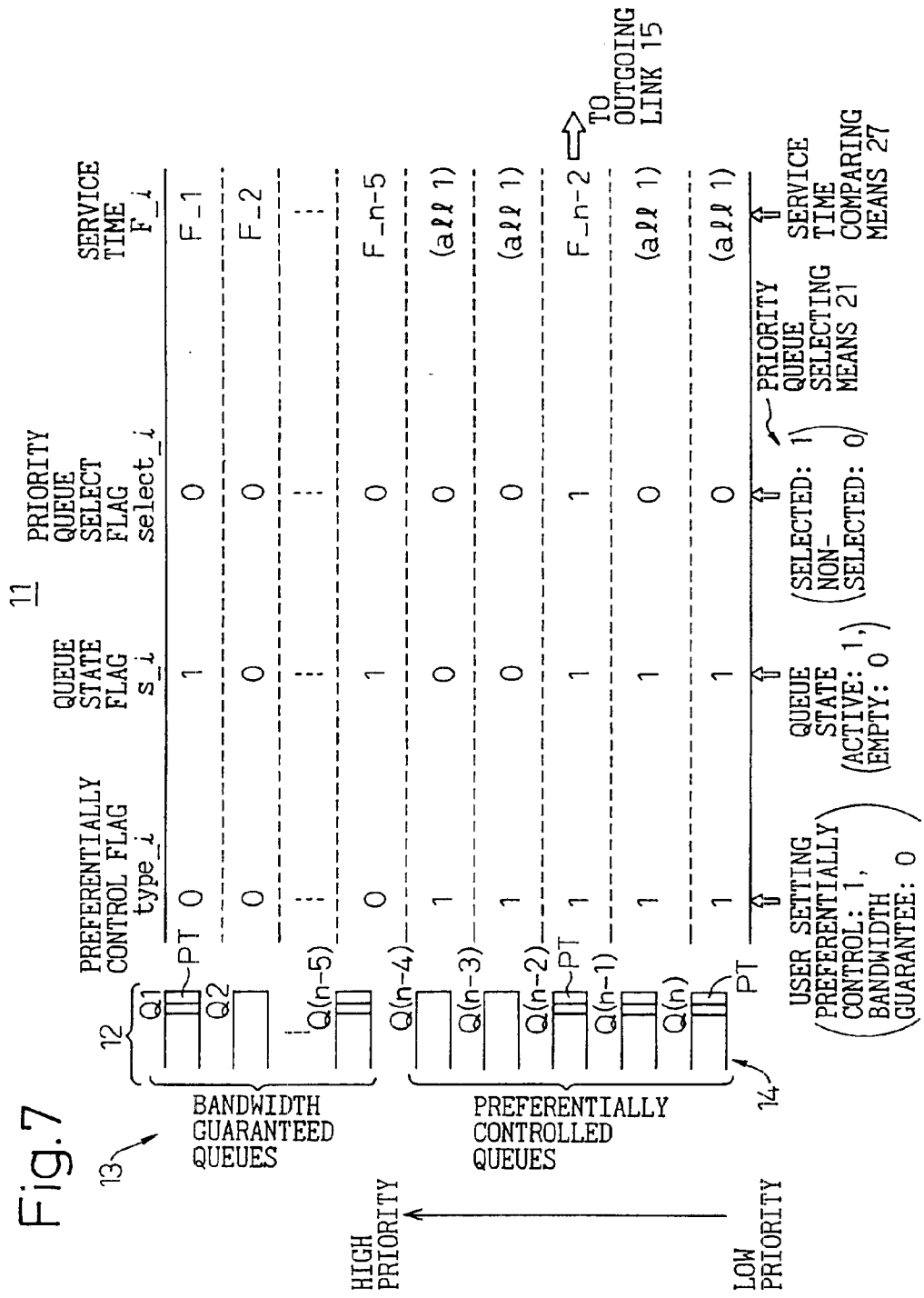
FIG. 7 is a view illustrating an operation of a packet scheduling apparatus 11 according to the present invention.

FIG. 7 is a view illustrating the operation of the packet scheduling apparatus 11 according to the present invention. Note that, the figure mainly pays attention to the priority queue selecting means 21 and the service time comparing means 27 in the same apparatus 11.

The queue set 12 at the left end of the figure is as shown at the left end of FIG. 3.

At the top row in the figure, type_i is the preferentially control flag and is determined by the determination of step S13 of FIG. 6 mentioned above.

s_i is the queue state flag and is determined according to the determination of step S17 (and S14) of FIG. 6.

select_i is a priority queue select flag and is determined by the determination at step S14 of FIG. 6.

When viewing the flag type_i, the flags of the bandwidth guaranteed queues 13 are all 0, while the flags of the priority queue class 14 are all 1.

When viewing the flag s_i, the flags of the active queues storing packets PT among the queues (Q1 to Qn) shown at the left end of FIG. 7 are all 1, while the flags of the others are all 0.

When viewing the flag select_i, in the example of FIG. 7, since the queue having the highest priority order in the priority queue class 14 and among the active queues Q(n-2) to Qn is Q(n-2), select_i becomes 1 for the queue Q(n-2), while becomes 0 for the others.

The service time comparing means 27 selects the minimum among F1 to F(n-5) and F(n-2) (F(n-2) in the example of the present figure) based on the service time (F_i) information from the service time computing means 25 shown in FIG. 4 and sends the related packet to the outgoing link 15. Note that, as already mentioned, values (all 1) larger than the maximum value able to be taken as the service time are set for the unselected priority queues, and these service times are easily excluded from the comparison. The comparison of the service times will be explained later in further detail.

Figure 8:
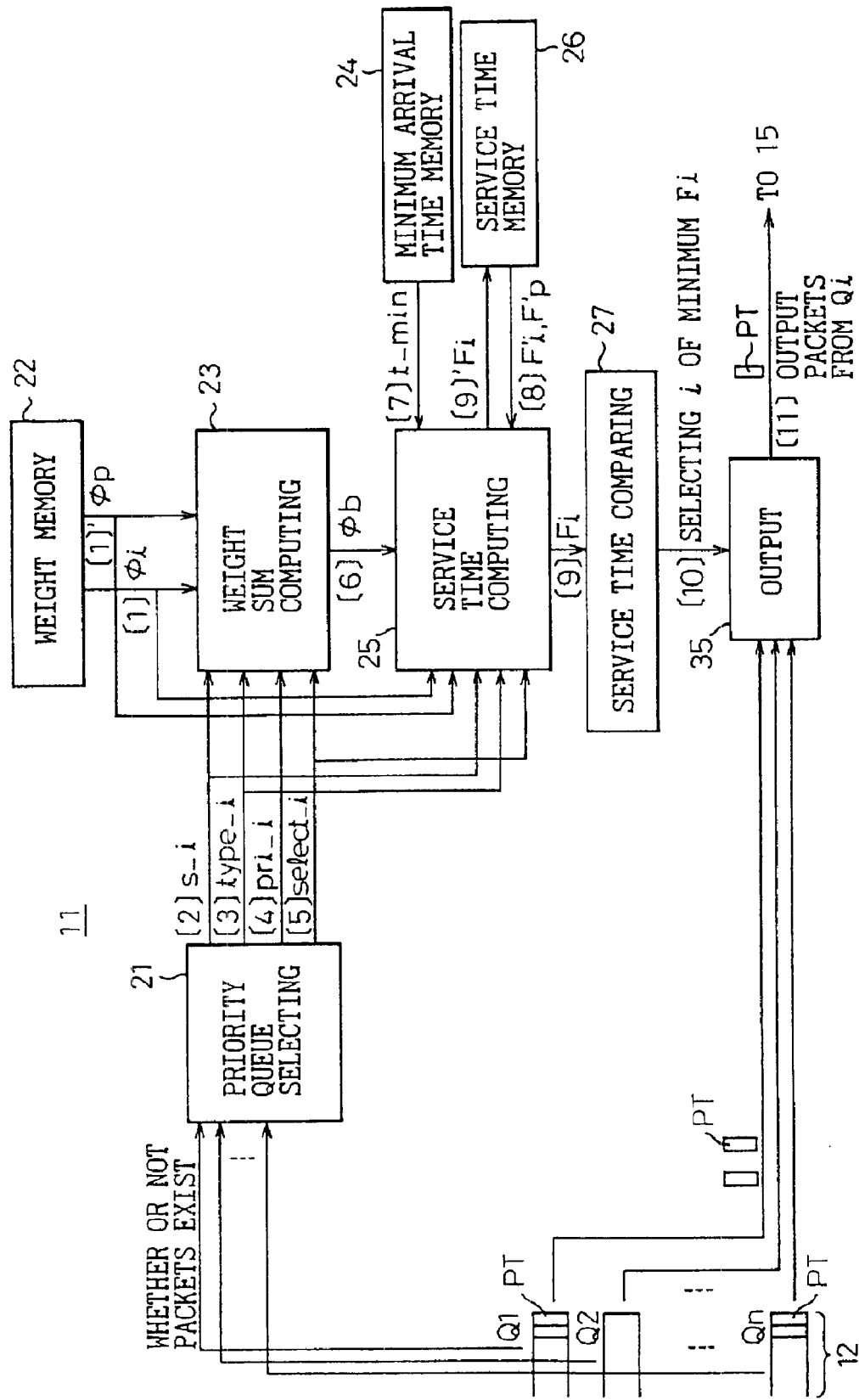
FIG. 8 is a view of an example of a further concrete configuration of the apparatus 11 according to the first embodiment shown in FIG. 4.
Figure 9:
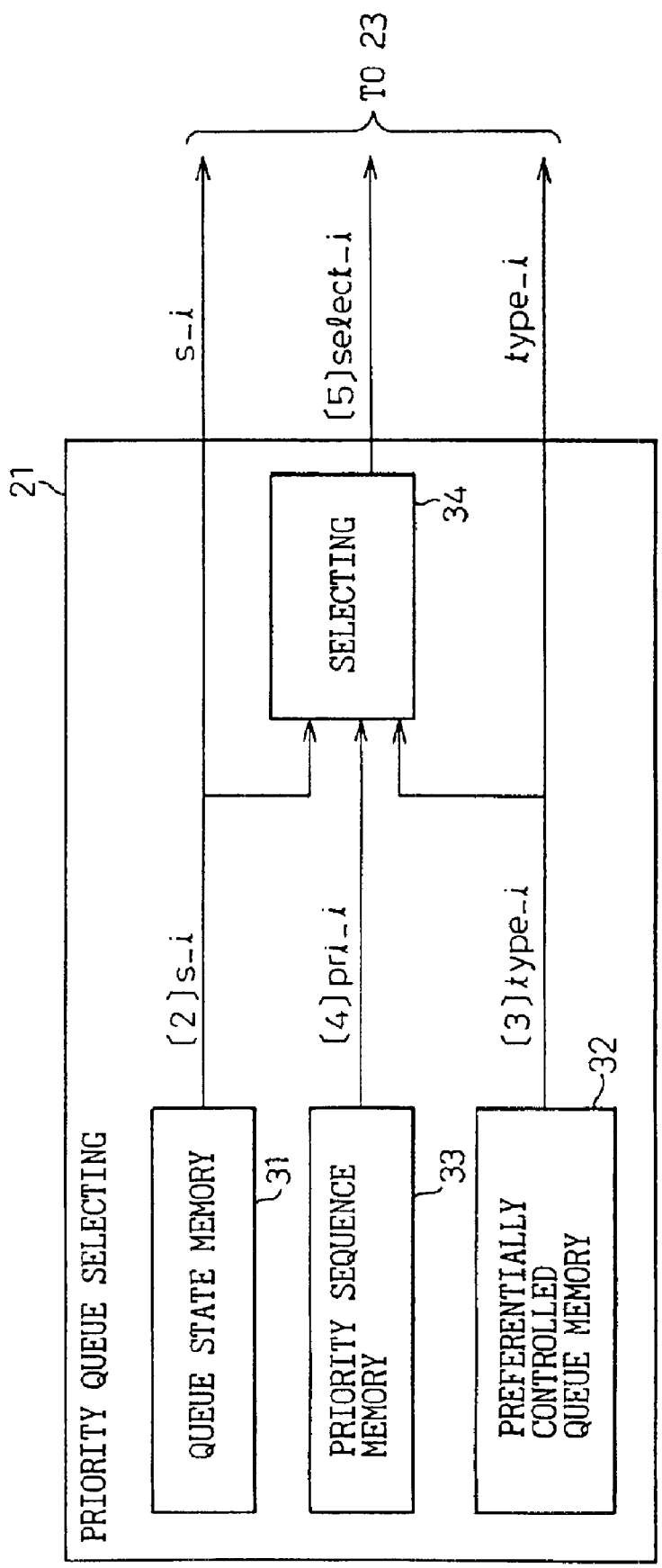
FIG. 9 is a view of an example of a further concrete configuration of the selecting means 21 according to the first embodiment shown in FIG. 5.

FIG. 8 is a view of an example of a further concrete configuration of the apparatus 11 according to the first embodiment shown in FIG. 4, and FIG. 9 is a view of an example of a further concrete configuration of the selecting means 21 according to the first embodiment shown in FIG. 5.

An explanation will be made below of an example of the operation where WFQ is applied as the packet fair queuing while mainly referring to FIG. 8 and FIG. 9.

First, it is assumed that the packets arriving at the packet transfer system 10 are stored in the queues (Q1 to Qn) separately for the flows (refer to FIG. 3). In the example of FIG. 3, Q1 to Q(n-5) are bandwidth guaranteed queues, and Q(n-4) to Qn are priority queues. Note that, as already mentioned, the assignment of the bandwidths to the queues of the bandwidth guaranteed queues and the priority queues can be freely modified by designation from the user and are not limited to the combination of this example.

1) The weight memory means 22 notifies the weights φi of the bandwidth guaranteed queues stored in it and the weight φp of the priority queue class 14 to the weight sum computing means 23 and the service time computing means 25 [1], [1]'.

Here, it is assumed that, as the weight φi of the bandwidth guaranteed queue i, $\phi i = w\_i/R$, and as the weight φp of the priority queue class, $\phi p = (R - w\_all)/R$.

are set. As mentioned above, w_i represents the reserved bandwidth of the bandwidth guaranteed queue i, R represents the outgoing link rate, and w_all represents the sum of the reserved bandwidths of the traffic to be bandwidth guaranteed.

2) The queue state memory means 31 has 1-bit variables s_1 to s_n as the queue state flags (s_i of FIG. 7). If a packet to be output from the queue i is stored, s_i=1 is set, while if it is not stored, s_i=0 is set. The queue state flags s_i are notified to the selecting means 34 (FIG. 9), service time computing means 25, and the weight sum computing means 23 [2].

3) The preferentially controlled queue memory means 32 (FIG. 9) has 1-bit variables type_1 to type_n as the preferentially control flags (type_i of FIG. 7). The means 32 sets type_i=1 when the flow for preferential control is assigned to the queue i, while sets type_i=0 when the flow for the bandwidth guarantee is assigned to the queue i. In the example of FIG. 3, 0 is set for type_1 to type_(n-5), and 1 is set for type_(n-4) to type_n.

This preferentially control flags type_i are notified to the selecting means 34, service time computing means 25, and the weight sum computing means 23 [3].

4) The priority order memory means 33 (FIG. 9) has variables pri_1 to pri_n as the priority order table and sets the priority order of a queue i as pri_i. Note that the priority order is represented by values of 1 to n from the highest priority down. In the example of FIG. 3, values of 1 to 5 are set for pri_(n-4) to pri_n. The contents of the priority order table are notified to the selecting means 34 and the service time computing means 23 [4].

5) The selecting means 34 selects the highest priority queue with the packet PT stored therein according to a predetermined routine and outputs the queue number thereof as select_i [5]. This predetermined routine will be shown in FIG. 10 and FIG. 11 later.

6) The weight sum computing means 23 computes the sum $\phi b$ of weights of active queues from $\phi\_i$, $\phi\_p$, $s\_i$, type_i, and select_i according to a predetermined routine and notifies this $\phi b$ to the service time computing means 25 [6]. This predetermined routine will be shown in FIG. 12 later.

7) The minimum arrival time memory means 24 notifies the minimum value of the arrival times of the packets PT stored in the priority queues (14) as t_min to the service time computing means 25 [7].

8) The service time memory means 26 stores the service finish time F'i of the packet PT output from the queue i immediately before the service. Further, for the priority queue class 14, it stores the service finish time of the packet PT output last among them as F'p. The service finish time stored in this way is notified to the service time computing means 25 [8].

9) The service time computing means 25 computes the service finish time of the queue i as shown below. The value of the computed Fi is notified to the service time comparing means 27 and the service time memory means 26 [9], [9]'.

a) When the queue i is a bandwidth guaranteed queue 13:

$$r\_i=\phi\_i \times R/\phi\_b$$

$$Fi=\max\{t\_i, F'i\}+L\_i/r\_i$$

b) When the queue i is a selected priority queue (select_i=1):

$$r\_i=\phi\_p \times R/\phi\_b$$

$$Fi=\max\{t\_min, F'p\}+L\_i/r\_i$$

c) When the queue i is an unselected priority queue (select_i=0) or inactive bandwidth guaranteed queue 13:

$$Fi=(\text{all 1})$$

For (all 1), refer to the right end of FIG. 7.

Here, reconfirming the meanings of the symbols, they are as follows:

R: Speed of the outgoing link 15
t_i: Arrival time of the header packet
t_min: Arrival time of the packet PT arriving at the priority queue class 14 first
F'i: Service time of the packet PT output from the queue i immediately before the service
L_i: Packet length of the header packet PT of the queue i
$\phi\_p$: Weight of the priority queue class 14
F'p: Service time of the packet PT output from the priority queue class 14 immediately before the service
all 1: All bits are 1 in a binary notation and indicating the maximum value.

10) The service time comparing means 27 compares the magnitudes of the service finish times F1 to Fn (refer to the right end of FIG. 7). In this case, both of the service times of the bandwidth guaranteed queues 13 and the service times of the selected priority queue take values smaller than (all 1), therefore the unselected priority queues will not be selected by comparison of the magnitude.

If this (all 1) is not set, whether or not each priority queue is selected is notified as select_i from the priority queue selecting means 21, and processing is performed excluding the service time Fi of a queue i wherein the select_i becomes equal to 0 from the comparison of magnitude.

Thus, the queue i exhibiting the minimum Fi value is notified to the output means 35 [10].

11) The output means 35 reads out the header packet of the queue i notified from the service time comparing means 27 and sends this to the outgoing link 15 [11].

In the above explanation, it was said that the predetermined routines would be explained later in FIG. 10, FIG. 11, and FIG. 12. These are explained here.

Figure 10:
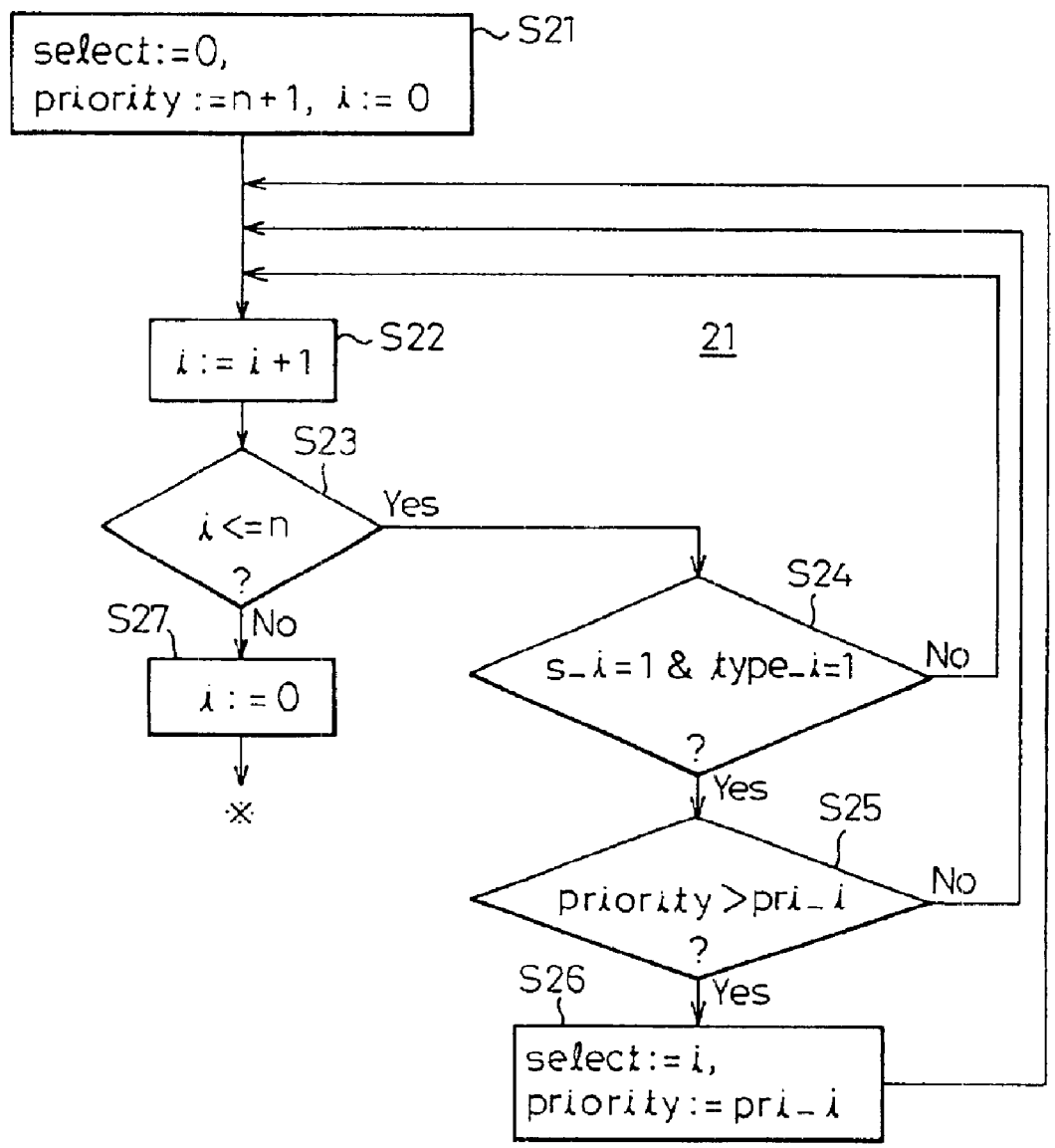
FIG. 10 is a first part of a flowchart of an example of the routine for selecting the queue of the highest priority and outputting a queue number thereof as select_i.
Figure 11:
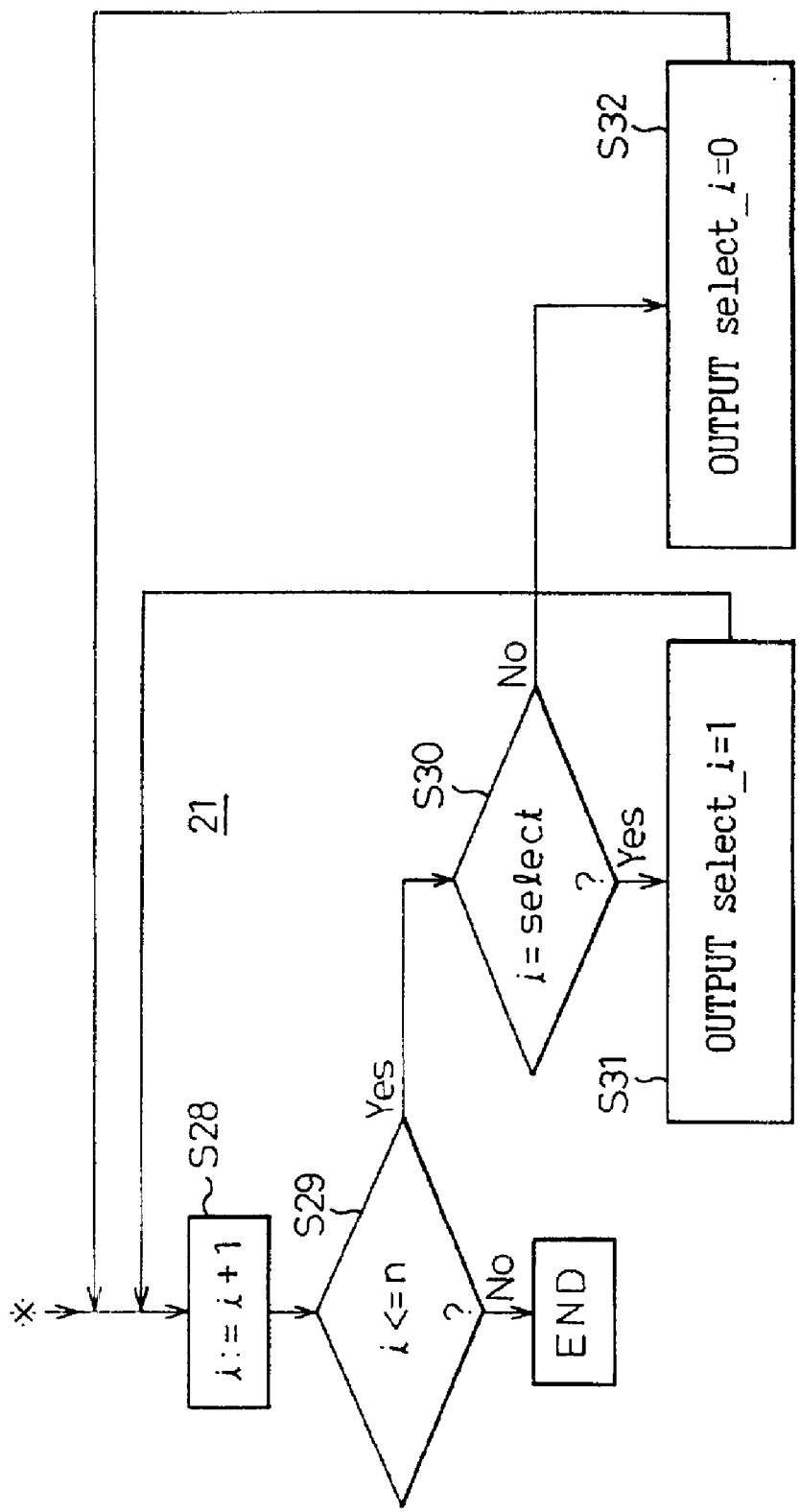
FIG. 11 is a second part of a flowchart of an example of the routine for selecting the queue of the highest priority and outputting a queue number thereof as select_i.

FIG. 10 and FIG. 11 are parts of a flowchart of an example of a routine for selecting the highest priority queue and outputting the queue number thereof as select_i.

The steps will be explained by referring to FIG. 10 and FIG. 11.

Step S21: The initial values are set for select, priority (pri), and i (queue i). Note that, as priority, a value which cannot be selected is set.

Step S22: The queue i is incremented one by one.

Step S23: When it is Yes in this determination, an unprocessed queue i remains.

Step S24: It is determined if the queue to be noted is active in state (having packets) and a queue of the priority queue class 14. If the answer is No, the operation routine returns to the original processing again.

Step S25: When the priority order (priority) of the queue to be noted is larger than pri_i of the currently selected queue, the operation routine returns to the original processing. The smaller the value of pri_i, the higher the priority.

Step S26: When pri_i of the queue to be noted is smaller than pri_i of the queue already selected at present, select_i and pri_i in the priority queue selecting means 21 are once stored.

Step S27: The queue i is returned to i=0 again.

Step S28: The queue i is incremented one by one again.

Step S29: It is determined if all queues i are processed. If there is an unprocessed queue i (Yes), the operation routine shifts to step S30.

Step S30: It is determined whether or not the queue i to be noted is the same as the selected one.

Step S31: If it is the same, this queue i is selected and select=1 is output from the selecting means 34.

Step S32: When it is not the same, this queue i is determined as unselected, and select=0 is output from the selecting means 34.

Figure 12:
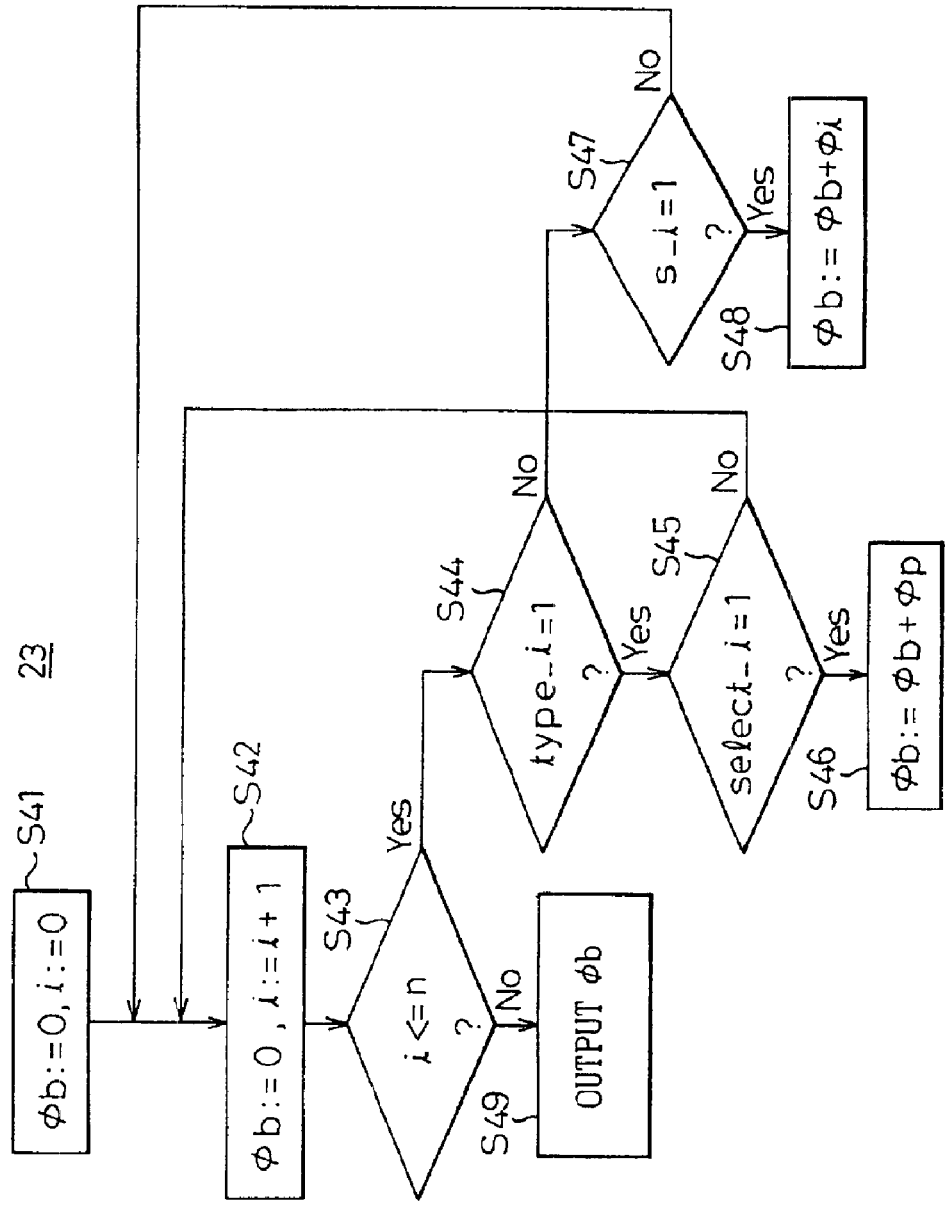
FIG. 12 is a flowchart of an example of a routine for finding a weight sum $\phi b$.

FIG. 12 is a flowchart of an example of the routine for finding the sum $\phi b$ of the weights.

The flowchart of the present figure corresponds to the steps when concretely programming the flowchart of FIG. 6. Accordingly, most of steps S41 to S49 of the present figure correspond to steps S11 to S19 of FIG. 6. For example, the steps of the present figure and the steps of FIG. 6 correspond as follows: S44=S13, S45=S14, S46=S15, S47=S17, and S48=S18.

Above, an explanation was made of the first embodiment according to the present invention. Next, an explanation will be made of a second embodiment according to the present invention.

Figure 13:
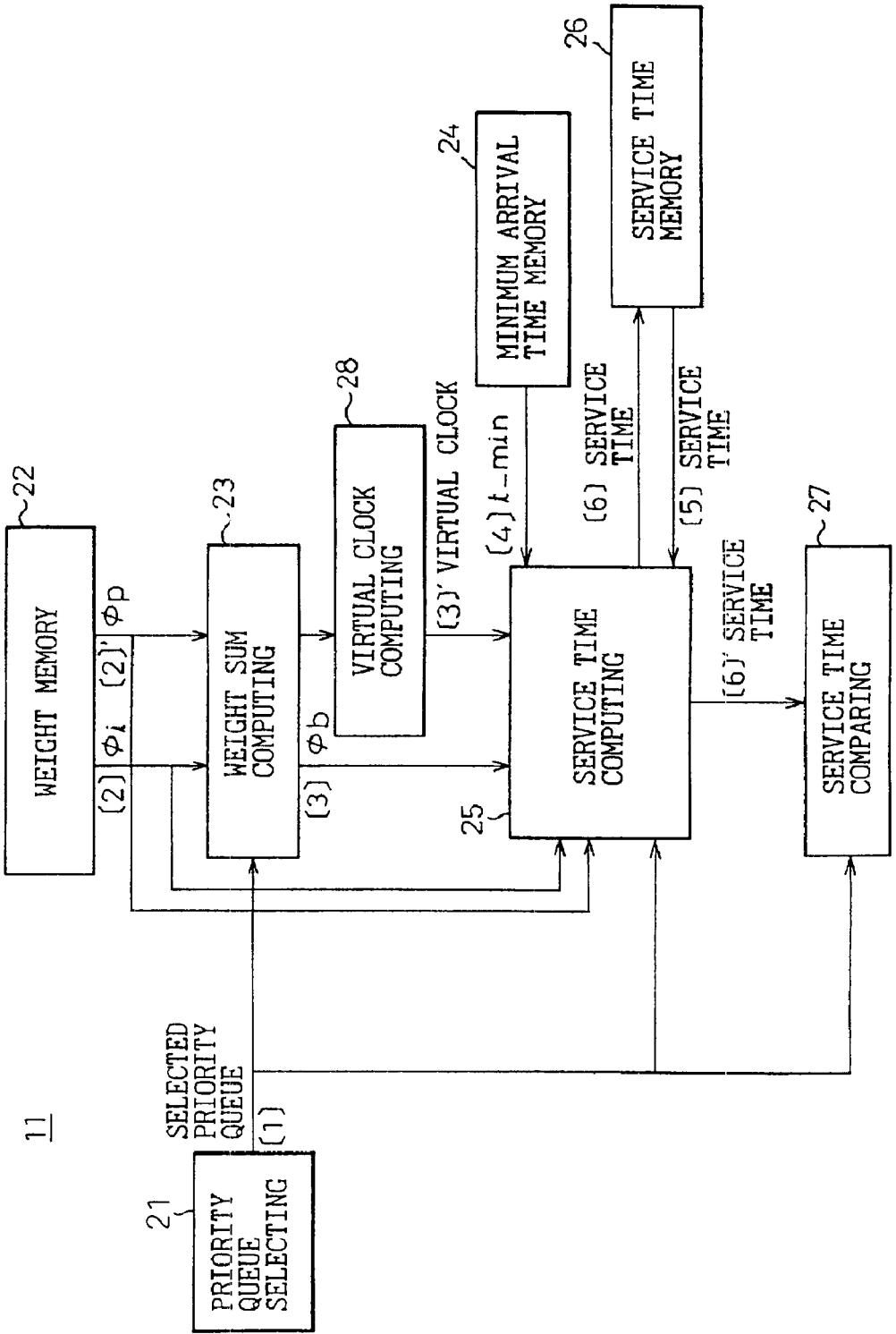
FIG. 13 is a view of the configuration according to a second embodiment of the present invention.

FIG. 13 is a view of the configuration according to the second embodiment of the present invention.

When comparing the present figure (second embodiment) and FIG. 4 (first embodiment), the difference from FIG. 4 resides in the point of further adding a virtual clock computing means 28 in the present figure. Note that, as the configuration of the present figure, the configuration of the case where the SCFQ (Self Clocked Fair Queuing) is applied as the packet fair queuing is shown.

The virtual clock computing means 28 distinctive to the second embodiment has the function of computing the virtual clock based on the weight sum computed at the weight sum computing means 23.

This weight sum computing means 23 computes the weight sum φb of queues storing packets, that is, active queues as mentioned in detail in the first embodiment, and notifies it to the virtual clock computing means 28 and the service time computing means 25 ([3]' and [3] of FIG. 13).

In the first embodiment, the computation was made by using a real clock. In contrast, in the second embodiment, the virtual clock computing means 28 is introduced, and the computation is carried out by using a virtual clock v(T) using the real clock as the parameter by the means 28. Here, the virtual clock v(T) is computed so that the ratio of change relative to the real clock is substantially inversely proportional to the ratio of change of the weight sum φb. When exemplifying φb as one pipe, when φb is large, the pipe is fat and the packets flowing there advance quickly time wise, while when φb is small, the pipe is thin, so the packets flowing there advance slowly time wise. The virtual clock v(T) considers such a change of time. When this v(T) is used, a speed up of the computation can be achieved. Thus, the computed virtual clock v(T) is notified to the service time computing means 25 [3]'.

In this way, when a virtual clock v(T) is used, the service time of the header packet of the selected priority queue is computed by the virtual clock v(t_min) at_t min in addition to the above parameters.

Thus, in the second embodiment, the virtual clock computing means 28 is provided for computing a virtual clock based on the output from the weight sum computing means 23, the minimum arrival time memory means 24 stores the virtual clock at the time of arrival of the packet arriving at the priority queue class first based on the virtual clock, the service time computing means 25 computes the service time based on the virtual clock, and the virtual clock stored in the minimum arrival time memory means 24 is used for the computation of the service time of the priority queue selected by the priority queue selecting means 21.

Figure 14:
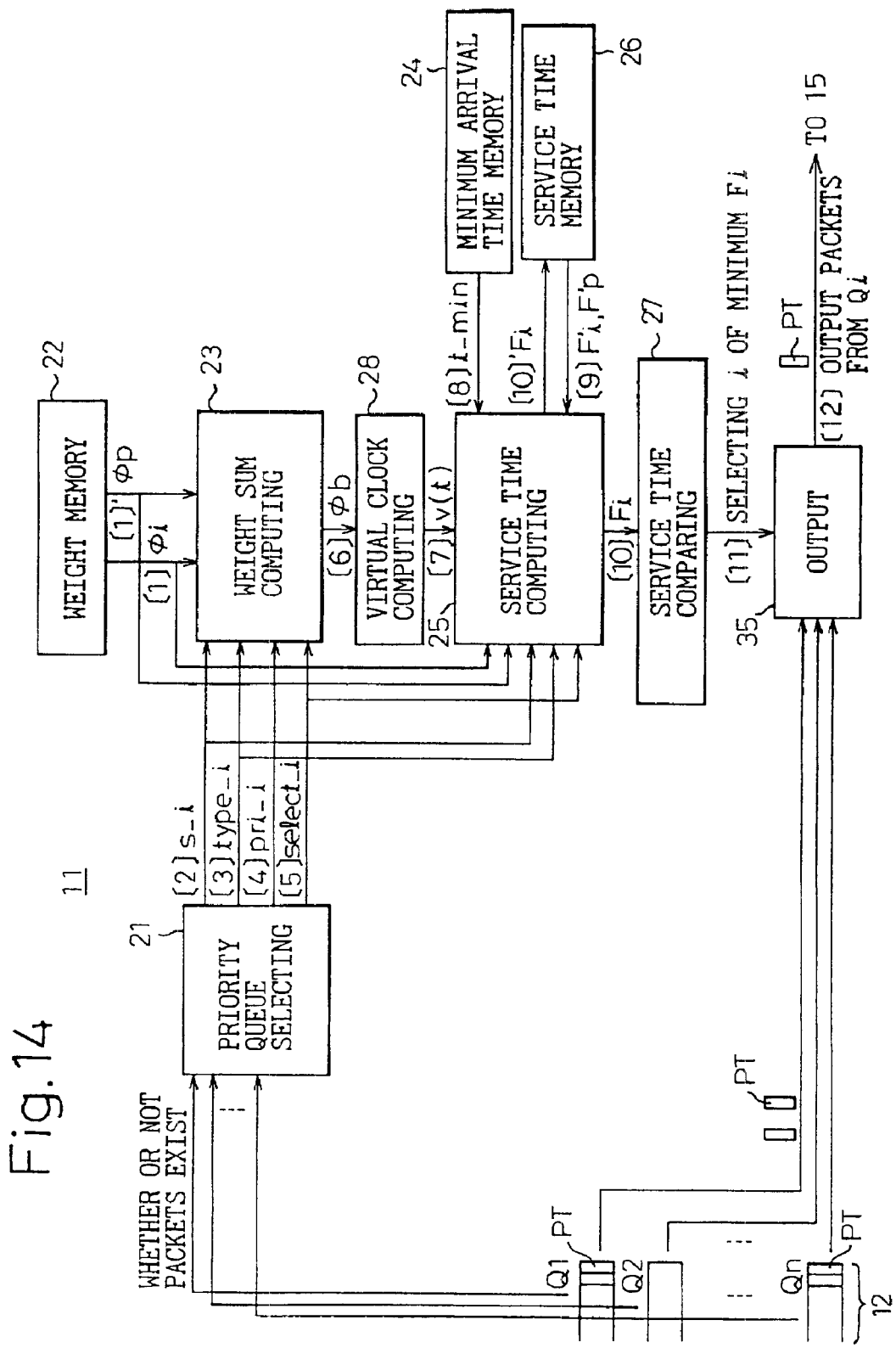
FIG. 14 is a view of an example of a further concrete configuration of the apparatus 11 according to the second embodiment shown in FIG. 13.

FIG. 14 is a view of an example of a further concrete configuration of the apparatus 11 according to the second embodiment shown in FIG. 13.

Most of the operations in the configuration shown in the present figure are similar to the operations 1) to 11) of the configuration of the first embodiment explained by using FIG. 8, therefore different portions will be explained in detail below.

Note that, this is an example of an operation applying SCFQ using a virtual clock as the packet fair queuing.

1) The same operation as the operation 1) of the first embodiment already explained by referring to FIG. 8 (hereinafter, referred to as Embodiment 1) is performed. Namely, φi and φp are notified to the weight sum computing means 23 ([1] and [1]' of FIG. 14).

2) The same operation as the operation 2) of Embodiment 1 is performed (the queue state flag s_i is notified to the means 23) [2].

3) The same operation as the operation 3) of Embodiment 1 is performed (the preferentially control flag type_i is notified to the means 23) ([3] of FIG. 14).

4) The same operation as the operation 4) of Embodiment 1 is performed (the priority order flag pri_i is notified to the means 23) ([4] of FIG. 14).

5) The same operation as the operation 5) of Embodiment 1 is performed (the priority queue selection flag select_i is notified to the means 23) ([5] of FIG. 14).

6) The same operation as the operation 6) of Embodiment 1 is performed (the sum φb is transferred, but in the second embodiment, φb is transferred to the virtual clock computing means 28) ([6] of FIG. 14).

7) The virtual clock computing means 28 computes the virtual clock v(T) at the real clock T as follows:

$$v(0)=0,$$

$$v(T\_2)-v(T\_1)=\phi\_all/\phi b$$

Here, $T\_2 > T\_1$, and $\phi\_all$ = (sum of weights $\phi\_i$ of bandwidth guaranteed queues 13)+(weight $\phi\_p$ of the priority queue class 14).

The virtual clock v(T) computed in this way is notified to the service time computing means 25 ([7] of FIG. 14).

8) The minimum arrival time memory means 24 stores the minimum value t_min among the arrival times of the packets PT stored in the priority queue 14 and virtual clock v(t_min) and notifies them to the service time computing means 25 ([8] of FIG. 14).

9) The service time memory means 26 stores the service finish times Fi of the packets stored in the queues i and the packet in service or immediately after the service in relation to the packets. Further, it stores the service finish time of the packet output last from the priority queue class 14 as F'p. It notifies the stored service finish time to the service time computing means 25 ([9] of FIG. 14).

10) The service time computing means 25 computes the service finish times as follows for the packets PT arriving at the queues i.

a) Where the queue i is a bandwidth guaranteed queue 13, $$Fi=\max\{F'i, v(t)\}+L\_i/r\_i$$

b) Where the queue i is a selected priority queue (select_i=1), $$Fi=\max\{F'p, v(t\_min)\}+L\_i/r\_i$$

c) Where the queue i is an unselected priority queue (select_i=0) or inactive bandwidth guaranteed queue 13, $$Fi=(\text{all 1})$$

Here, reconfirming the meanings of the symbols, they are as follows.

v(T): Virtual clock at time T
t: Time when the packet arrives
t_min: Arrival time of the packet PT arriving at the priority queue class 14 first
L_i: Packet length of the header packet PT of the queue i
φ_p: Weight of the priority queue class 14
F'p: Service time of the packet PT output from the priority queue class 14 immediately before the service
all 1: All bits are 1 in a binary notation and indicating the maximum value. Note, it is assumed that the service time of the header packet of the selected priority queue is computed again at a point of time when a packet becomes the header of the queue or is selected as the priority queue to be output.

The value of the computed Fi is notified to the service time comparing means 27 and the service time memory means 26 ([10] and [10]' of FIG. 14).

11) The same operation as the operation 10) of Embodiment 1 is performed (Fi is notified to the output stage 35) ([11] of FIG. 14).

12) The same operation as the operation 11) of Embodiment 1 is performed (the packet PT is sent to the outgoing link 15) ([12] of FIG. 14).

Summarizing the effect of the invention, as explained above, according to the method of packet scheduling of the present invention, a bandwidth guarantee similar to that of packet fair queuing and a fair bandwidth assignment are enabled and a high priority packet can always be sent to the outgoing link before a packet of lower priority. Accordingly, a bandwidth guarantee and fair assignment of the remaining bandwidth are carried out for the bandwidth reserved traffic. Among the bandwidth unreserved traffics, a certain preferential control is performed in units of packets, thus a high quality of service can be guaranteed.

Further, in the present invention, packet fair queuing reducing the trouble of computation by using a virtual clock can be easily applied. In this case, a packet scheduling apparatus capable of achieving a further speed up of the processing can be realized.

Furthermore, according to the present invention, the assignment of the bandwidth guaranteed queues and the priority queues can be freely changed for the queues in the packet scheduling apparatus. Accordingly, where there is a lot of traffic requesting bandwidth guarantees, the ratio of the bandwidth guaranteed queues can be freely increased. For this reason, it becomes possible to effectively reutilize the queues in the apparatus.

Further, in the present invention, in the comparison of the magnitudes of the service times, the unselected priority queues can be excluded from the comparison by only giving all 1 as the service time. Accordingly, the processing for such exclusion becomes unnecessary, and therefore the service times can be compared and the packets to be output can be determined at a high speed.

Furthermore, in the present invention, the reserved bandwidth $\phi p$ of the priority queue class is determined by equation (3). Therefore, traffic having a high degree of priority can preferentially use any unreserved bandwidth of an outgoing link, therefore preferential control is more smoothly executed.

While the invention has been described by reference to specific embodiments chosen for purposes of illustration, it should be apparent that numerous modifications could be made thereto by those skilled in the art without departing from the basic concept and scope of the invention.

What is claimed is:

1. A method of packet scheduling for selecting a packet to be output first among packets stored in a plurality of bandwidth guaranteed queues having reserved bandwidths guaranteed therefor and queues of a priority queue class having a plurality of priority queues having priority orders set in advance therefor and subject to preferential control, comprising the steps of storing weights given to said bandwidth guaranteed queues and a weight given to overall said priority queue class, referring to said stored weights and totaling the weights of said bandwidth guaranteed queues when there are queues in the backlog state and the weight of the priority queue class when there are priority queues in the backlog state to compute the sum, computing service times for said queues in the backlog state by using at least said weight, said sum, and the minimum arrival time of the packet having a high priority order and arriving at said priority queue class first as parameters, and selecting the single packet having the minimum service time as said packet to be output first by a comparison of magnitudes among said service times.

2. A method as set forth in claim 1, wherein said service times are computed by using a virtual clock in place of a real clock.

3. A method as set forth in claim 1, wherein unselected priority queues are excluded from the computation of said service times according to said priority order.

4. A packet scheduling apparatus for selecting a packet to be output first among packets stored in a plurality of bandwidth guaranteed queues having reserved bandwidths guaranteed therefor and a plurality of priority queues forming a priority queue class having priority orders set in advance therefor and subject to preferential control, comprising:

a parameter generating unit for generating first parameters, second parameters, and third parameters, said first parameters including weights given to said bandwidth guaranteed queues and a weight given overall to said priority queue class, said second parameters including a sum computed by totaling the weights of said bandwidth guaranteed queues when there are queues in the backlog state and the weight of the priority queue class when there are priority queues in the backlog state, said third parameters including a minimum arrival time of a packet having a higher priority order and arriving at one of the plurality of priority queues in said priority queue class first, a service time computing unit for computing service times for said queues in the backlog state by using at least said first parameters, said second parameters, and said third parameters as parameters, and a service time comparing unit for comparing the magnitudes of the computed service times with each other and selecting the packet having the minimum service time as said packet to be output first.

5. An apparatus as set forth in claim 4, wherein said parameter generating unit has a weight memory means for storing weights given to said bandwidth guaranteed queues and weights given to overall said priority queue class as said first parameters.

6. An apparatus as set forth in claim 5, wherein said parameter generating unit has a priority queue selecting means for selecting a single priority queue based on information concerning said bandwidth guaranteed queues in the backlog state and said priority queues and said priority order.

7. An apparatus as set forth in claim 6, wherein said parameter generating unit has a weight sum computing means receiving as input information concerning the weights of the single priority queue selected by said priority queue selecting means and said bandwidth guaranteed queues in the backlog state and said queues in the related backlog state provided from said weight memory means and totaling the weights of the queues to compute a sum of weights.

8. An apparatus as set forth in claim 7, wherein said parameter generating unit has a minimum arrival time memory means for storing the minimum arrival time of the packet arriving at said priority queue class first.

9. An apparatus as set forth in claim 8, wherein said parameter generating unit has a service time memory means for storing a computed time in relation to said service time computed at said service time computing unit in accordance with a service status for every said packet and feeding back the computed time to the service time computing unit for the computation for a next packet.

10. An apparatus as set forth in claim 7, wherein said weight sum computing means adds said weights of said bandwidth guaranteed queues in the backlog state together and adds the weight of said priority queue class together if there is any of the plurality of priority queues in the backlog state so as to compute said sum.

11. An apparatus as set forth in claim 9, wherein the service time memory means stores a service finish time of the packet output from the same queue immediately before the service and stores the service finish time of the packet output last from said priority queue class.

12. An apparatus as set forth in claim 8, wherein said service time computing unit computes said service time by said minimum arrival time, service finish time, and the weight of said priority queue class for said priority queue selected by said priority queue selecting means.

13. An apparatus as set forth in claim 6, wherein said service time comparing unit sets a value larger than the maximum value which can be usually taken by the service time as said service time for excluding said priority queues not selected by said priority queue selecting means from said comparison of the magnitude.

14. An apparatus as set forth in claim 6, wherein said priority queue selecting means comprises a queue state memory means for storing information of whether or not said packet is stored in each said queue, a preferentially controlled queue memory means for storing information of whether or not each said queue is said priority queue, and a priority order memory means for storing information concerning said priority order and selects the packet of high priority in the backlog state based on said information and outputs the selected information.

15. An apparatus as set forth in claim 5, wherein said weight given to overall said priority queue class is set by a difference between the sum of said weights given to said bandwidth guaranteed queues and a speed of an outgoing link for sending said packet to be output first.

16. An apparatus as set forth in claim 8, wherein provision is further made of a virtual clock computing means for computing the virtual clock based on the output from said weight sum computing means, said minimum arrival time memory means stores the virtual clock at the arrival time of the packet arriving at said priority queue class first based on said computed virtual clock, and said service time computing unit computes said service times for said bandwidth guaranteed queues and for said priority queues selected by said priority queue selecting means based on said stored virtual clock.

* * * * *